May 10, 1949.　　　　J. G. OETZEL　　　　2,469,402
BRAKE ANCHOR
Filed Dec. 7, 1944
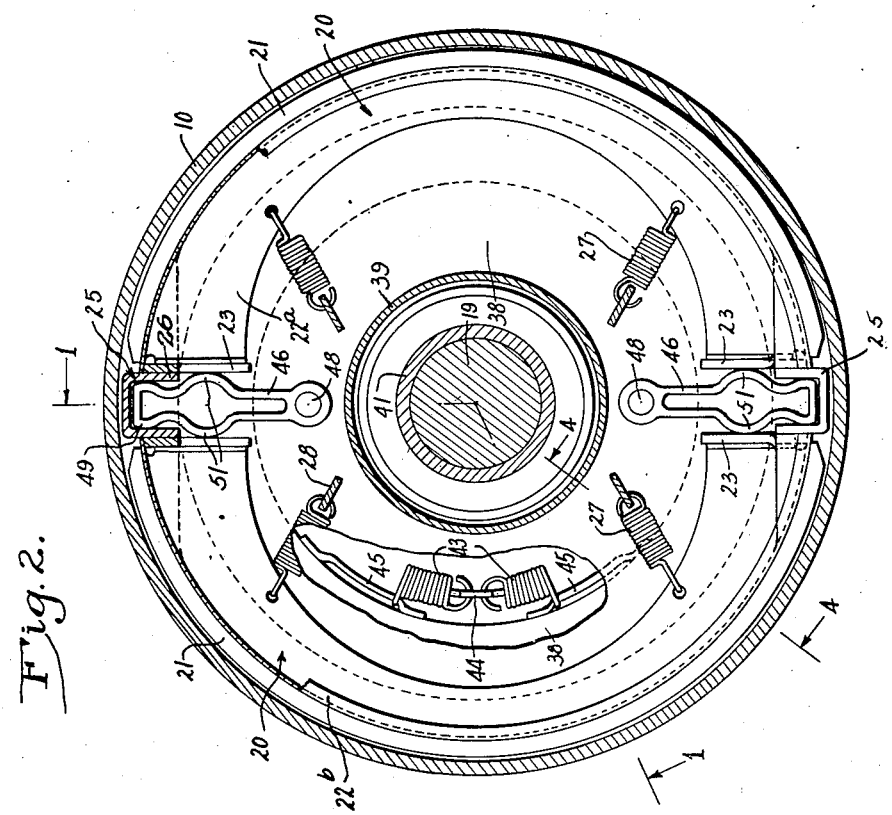
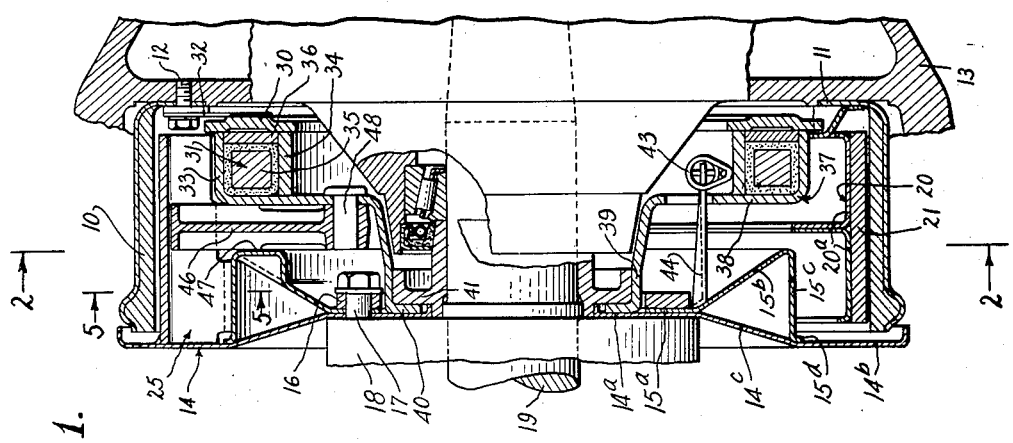
INVENTOR
John George Oetzel
BY Carlson, Pitzner, Hubbard, Wolfe
ATTORNEYS Patented May 10, 1949

2,469,402

UNITED STATES PATENT OFFICE 2,469,402

BRAKE ANCHOR

John George Oetzel, Beloit, Wis., assignor to Warner Electric Brake Manufacturing Company, South Beloit, Ill., a corporation of Illinois Application December 7, 1944, Serial No. 567,004

3 Claims. (Cl. 188—206)

This invention relates to an anchor for a brake mechanism of the internal expanding type.

The general object of the invention is to provide a novel brake anchor plate which is of simple and lightweight construction and which may be formed of light gauge sheet metal parts and readily assembled into a rigid structure by welding.

A more detailed object is to provide a brake anchor plate comprising a generally flat ring and an annulus of angular cross section having inner and outer peripheral edges secured rigidly to the first ring.

Other objects and advantages of the invention will become apparent from the following detailed description taken in connection with the accompanying drawings, in which:

Figure 1 is a diametrical sectional view of a brake mechanism embodying the novel features of the present invention, the section being taken along the line 1—1 of Fig. 2.

Fig. 2 is a section taken along the line 2—2 of Fig. 1.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The brake mechanism shown in the drawings for purposes of illustration is adapted to be mounted within a drum 10 for radial expansion of its friction elements into gripping engagement with the internal cylindrical surface of the drum. At one end, the drum has an inturned flange 11 which may be secured by screws 12 to one side of a vehicle wheel 13.

The open end of the drum is closed by an anchor plate comprising two sheet metal parts. One of these is a relatively thin disk 14 having flat inner and outer peripheral portions 14a and 14b joined by a coned portion 14c. The second part has a flat inner margin 15a spot welded to the portion 14a on the inner side thereof, a coned intermediate portion 15b disposed opposite and diverging outwardly away from the portion 14c, and a cylindrical outer flange 15c spanning the coned portions 14c and 15b with its out-turned edge 15d spot welded to the disk 14. When the portions 14a and 15a are clamped by a ring 16 and bolts 17 against a non-rotatable flange 18 of the wheel axle 19, the coned portions 14c and 15b form a rigid truss structure immediately adjacent the flange 18.

The friction element of the brake mechanism is somewhat larger in diameter than the cylindrical portion 15c of the anchor plate and of a width more than twice as great as the axial length of such portion. The latter thus projects into the friction element a distance short of the center line thereof. Herein, the friction element comprises two semi-circular shoes 20 covered with friction material 21 and composed of two sheet metal channels disposed side by side with their adjacent flanges spot welded together to form a central rib.

The outer surface of the plate 23 constitutes the shoe end and is disposed radially relative to the friction surface of the shoe. In the assembled brake mechanism, this end abuts against one side of an anchor member 25 comprising a channel of square U-shaped cross section having side flanges 26 at one end resting on and welded to the outer surface of the cylindrical outer part 15c of the brake anchor. The anchor channel thus projects parallel to the drum axis across the part 15c and beyond the latter for the full width of the shoe ends 23 which abut against opposite sides of the channel. Because the end surface of the shoe is flat and disposed generally radially, the shoe end when anchored against the channel is free to slide outwardly along the anchor surface thereby permitting the full length of the arcuate friction surface to be expanded against the drum. It will be observed that the plate 23 is substantially wider than the anchor channel, so that only the outer parts of the shoe ends engage the anchor, the inner portions of the end surfaces being disposed inwardly from the anchor and available as abutments for engagement by actuating levers to be described later. Each shoe end is normally drawn against its anchor by a contractile spring 27 connected to the shoe ribs at points spaced from the shoe ends. The other ends of the springs are attached to the ends of projections 28 anchored against the ring 16.

The operator for spreading the two pairs of shoe ends apart to expand the friction surface of the shoes is of the electromagnetic momentum type comprising two magnetic rings 30 and 31 mounted within the shoes and axially spaced inwardly from the shoe ribs 22a and adjacent the drum flange 11. The ring 30 is substantially flat and is supported from the flange 11 for yieldable axial floating movement. For this purpose, tangentially extending leaf springs 32 are secured at one end to the drum flange and at the other end to the back of the armature ring 30 at annularly spaced points. Suitable stop means (not shown) is provided to sustain the frictional torque applied to the armature when the latter is in a direction to compress the leaf springs. In addition to supporting the armature, these springs maintain the armature continuously in light mechanical contact with the face of the magnet.

The magnet 31 is of U-shaped cross section having two concentric poles 33 and 34, an annular coil 35 between them, and segments 36 of friction material spanning the poles and flush with the end faces thereof. Herein, the magnet is formed by welding together in abutting relation a cylinder forming the inner pole 34 and a ring 37 of Z-shaped cross section having a flange forming the outer pole 33, and a flat annulus 38 against which the cylinder 34 abuts and is welded intermediate the margins of the former. At the inner margin of the annulus, the ring 37 is bent reversely to form a tubular projection 39 having an inturned flange 40 at its end. This flange is disposed between the closure plate 14 and the end of a collar 41 rigidly held between the axle flange 18 and the wheel bearing. The collar provides a bearing for a portion of the tubular extension 39. This rugged mounting supports the magnet 31 for oscillation about the wheel axis and, together with the flange 40, is well adapted to sustain the overhanging weight of the magnet under the severe bending shocks which are encountered in the use of the brake mechanism on aircraft. Springs 43 act between a projection 44 on the anchor plate and eyes 45 on the magnet to hold the latter in normal brake-released position, and return the same to this position when the coil 35 is deenergized.

Movement of the magnet in either direction away from brake-released position moves the corresponding ends of the shoes 20 away from the anchor 25, the actuating forces being applied to the flat abutment surfaces of the shoe ends which are disposed inwardly from the anchor. To accomplish this and at the same time amplify the force derived frictionally from the momentum of the moving vehicle, levers 46 of substantial length are employed. These are disposed radially when the brake is released, and lie in the plane of the shoe center line and between the flat portion 38 of the magnet and a flattened part 47 (Fig. 1) at the inner end of the closure plate. Herein, the inner end of each lever is apertured to receive a pin 48 projecting rigidly from the annulus 38 a substantial distance inwardly from the magnet proper. The outer end 49 projects into the channel shaped anchor member 25 in which it has a floating fulcrum formed by rounding the sides of the lever to form side recesses. Intermediate its ends, the sides of the lever bulge outwardly as indicated at 51 to form convex cam surfaces which bear against the shoe ends 23 a short distance inwardly from the anchor flanges. The levers are thus adapted to swing in either direction away from brake-released position (Fig. 2). In this motion, one shoe end is moved away from its anchor, the outer end of the lever shifting inwardly in the anchor channel.

The brake being released, the parts will be positioned as shown in Fig. 2, all four shoe ends being drawn against their anchors 25 and the magnet 31 being correspondingly positioned. When the coil 35 is energized with the vehicle wheel in motion, the magnet grips the rotating armature and turns therewith in the direction of drum rotation. The levers 46 are swung in the same direction moving one of the associated shoe ends away from the anchors, the other shoe ends remaining fixed against the anchors. These anchored ends are, however, free to shift outwardly along the anchor thereby permitting the full arc of the friction surface on the shoe to come into effective gripping engagement with the drum. After the clearance has been taken up and the shoes have been expanded against the drum, slippage occurs between the magnet and armature, the magnet being held frictionally in actuated position. When the magnet is deenergized, the parts are spring returned to their released positions.

It will be observed from the foregoing that the parts of the improved brake are of comparatively light weight construction including many sheet metal stampings, and yet are extremely rugged and capable of sustaining the severe stresses encountered in aircraft use where the landing wheel brakes must be of high capacity. The construction of the anchor plate and magnet mounting provides a high degree of both radial and axial compactness which, together with the substantial capacity obtained for a given size and overall weight, renders the brake mechanism well suited for use on aircraft.

I claim as my invention:

1. An anchor for a friction brake mechanism comprising a generally flat sheet metal ring, a coaxial sheet metal ring having a cylindrical outer portion abutting and rigidly secured to said first ring, an inner portion converging inwardly toward and secured to the first ring, and a sheet metal channel having its flanges out-turned and secured against said cylindrical portion, said channel projecting from said second ring parallel to the axes of the rings.

2. An anchor for a friction brake mechanism comprising a generally flat sheet metal ring, a coaxial sheet metal ring of angular cross section having outer and inner peripheral edges abutting against and rigidly secured to said first ring, and a channel member having its flanges secured against the outer periphery of said second ring with one end of the channel abutting against and rigidly secured to the side of the first ring, the other end of said channel member projecting parallel to the ring axis beyond said second ring.

3. An anchor for a friction brake mechanism comprising a generally flat sheet metal ring, a coaxial sheet metal ring of smaller size than said first ring and of angular cross section having outer and inner peripheral edges abutting against and secured to said first ring so as to unite the two rings into a rigid truss structure, and an anchor member rigidly secured at one end to the side of said first ring adjacent the outer periphery thereof and projecting parallel to the axis of said rings across the periphery of said second ring, said member being secured to the periphery of said second ring and opposite sides thereof forming anchor abutments which face circumferentially in opposite directions.

JOHN GEORGE OETZEL.

REFERENCES CITED

The following references are of record in the file of this patent:

UNITED STATES PATENTS

| Number | Name | Date |
| --- | --- | --- |
| 1,761,231 | Pomeroy | June 3, 1930 |
| 1,762,710 | Bendix | June 10, 1930 |
| 1,892,606 | Bourdon | Dec. 27, 1932 |
| 1,908,443 | Pope | May 9, 1933 |
| 1,961,174 | Silver | June 5, 1934 |
| 2,347,388 | Ayers | Apr. 25, 1944 |
| 2,352,218 | Oetzel | June 27, 1944 |
| 2,353,750 | Oetzel | July 18, 1944 |